(12) United States Patent
Kumar et al.

(10) Patent No.: US 10,834,629 B2
(45) Date of Patent: Nov. 10, 2020

(54) METHOD FOR HANDLING CONGESTION TIMER UPON RECEIVING MESSAGE FROM NETWORK

(71) Applicant: Samsung Electronics Co., Ltd, Gyeonggi-do (KR)

(72) Inventors: Lalith Kumar, Bangalore (IN); Kailash Kumar Jha, Bangalore (IN); Pavan Kumar Devarayanigari, Bangalore (IN); Samiran Bhowmik, Bangalore (IN); Seshu Babu Songa, Bangalore (IN); Ricky Kaura, Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/368,528

(22) Filed: Dec. 2, 2016

(65) Prior Publication Data

US 2018/0049059 A1  Feb. 15, 2018

(30) Foreign Application Priority Data

Dec. 3, 2015  (IN) ............................. 6497/CHE/2015
Oct. 27, 2016  (IN) .......................... 6497/CHE/ 2015

(51) Int. Cl.
*H04W 28/02* (2009.01)
*H04W 8/02* (2009.01)
*H04W 48/18* (2009.01)
*H04W 60/04* (2009.01)

(52) U.S. Cl.
CPC ......... *H04W 28/0289* (2013.01); *H04W 8/02* (2013.01); *H04W 48/18* (2013.01); *H04W 60/04* (2013.01)

(58) Field of Classification Search
CPC ... H04W 28/0289; H04W 8/02; H04W 48/18; H04W 60/04
See application file for complete search history.

(56) References Cited

U.S. PATENT DOCUMENTS

| | | | |
|---|---|---|---|
| 2013/0182607 A1* | 7/2013 | Kim .................. | H04W 28/0215 370/254 |
| 2014/0036668 A1* | 2/2014 | Niemi .................... | H04L 47/28 370/230 |
| 2017/0094501 A1* | 3/2017 | Huang-Fu ............. | H04W 76/18 |

* cited by examiner

*Primary Examiner* — Thai Nguyen

(57) ABSTRACT

Embodiment herein achieves a method implemented in a mobile terminal. The method includes receiving a message from an entity in a network. Further, the method includes determining that a congestion timer T3246 is running, and performing one of stopping the timer T3246 and continuing the timer T3246. The method allows the UE to access the CS services when congestion at a MSC side is cleared.

18 Claims, 7 Drawing Sheets

US 10,834,629 B2

METHOD FOR HANDLING CONGESTION TIMER UPON RECEIVING MESSAGE FROM NETWORK

CROSS-REFERENCE TO RELATED APPLICATION(S) AND CLAIM OF PRIORITY

The present application is related to and claims the benefit under 35 U.S.C. § 119(a) of Indian Application No. 6497/CHE/2015 filed on Dec. 3, 2015 and Indian Application No. 6497/CHE/2015 filed on Oct. 27, 2016, the entire disclosures of which are incorporated herein by reference.

TECHNICAL FIELD

The present disclosure relates to a congestion control in a communication network, and more particularly to a mechanism for handling a congestion timer upon receiving a message from the communication network.

BACKGROUND

A mobile terminal (e.g., User Equipment (UE)) sends a Command Mode (CM) service/Location Area Update (LAU)/International Mobile Subscriber Identity (IMSI) attach request to a Mobile Switching Center (MSC) in a 2G/3G area. Then, the mobile terminal received the CM service/LAU/attach request reject message along with cause congestion from the MSC. The reject message includes a timer T3246 value. If the mobile terminal moved to a Long Term Evolution (LTE) area and if an evolved packet system mobility management (EMM) initiates combined TAU/Attach for both Evolved Packet System (EPS) and non-EPS bearer services, then the MME will forward registration request to the MSC for a Circuit Switched (CS) domain registration. If combined TAU/Attach accept message is received from the network, the mobile terminal is not clearing the CS congestion and still running the timer T3246.

As per current specification, (i.e., 24.301: 5.6.3.3) the timer T3246 can be stopped, if the network initiates a Non-Access Stratum (NAS) downlink transport message. The network initiates the transport of NAS messages by sending a DOWNLINK NAS TRANSPORT message. After receiving the DOWNLINK NAS TRANSPORT message, the mobile terminal stops the timer if running and the EMM entity in the mobile terminal shall forward the contents of the NAS message container IE to the SMS entity.

The above information is presented as background information only to help the reader to understand the present disclosure. Applicants have made no determination and make no assertion as to whether any of the above might be applicable as Prior Art with regard to the present application.

SUMMARY

To address the above-discussed deficiencies, it is a primary object to provide a method for handling a congestion timer during combined procedures.

Another object of the embodiments herein is to provide a method for handling the congestion timer upon receiving a message from a network.

Another object of the embodiments herein is to provide a method for receiving a combined registration accept message from an entity in the network.

Another object of the embodiments herein is to provide a method for receiving a downlink NAS transport message from the entity in the network.

Another object of the embodiments herein is to provide a method for determining that a congestion timer T3246 is running.

Another object of the embodiments herein is to provide a method for performing one of stopping the timer T3246 and continuing the timer T3246.

Another object of the embodiments herein is to provide a method for allowing a mobile terminal to access CS services when congestion at the MSC side is cleared.

Accordingly the embodiments herein provide a method for handling congestion during combined procedures. The method includes receiving a message from an entity in a network. Further, the method includes determining that a congestion timer T3246 is running, and performing one of stopping the timer T3246 and continuing the timer T3246.

In an embodiment, the message is a combined registration accept message.

In an embodiment, the message is a downlink Non-Access Stratum (NAS) transport message.

In an embodiment, the entity is a Mobility Management Entity (MME).

In an embodiment, the entity is a Serving GPRS Support Node (SGSN).

In an embodiment, the combined registration accept message is attach accept message with an attach result IE value as "combined GPRS attach" i.e. IMSI attach for GPRS and non-GPRS services are successful and if the mobile terminal is not configured for a NAS signaling low priority, then the timer T3246 is stopped. The attach accept message indicates GPRS and Non-GPRS successful.

In an embodiment, the combined registration accept message is attach accept message with an attach result IE value as "combined GPRS attach": IMSI attach for the GPRS and non-GPRS services are successful and if the mobile terminal is configured for the NAS signaling low priority, then the timer T3246 is continued. The attach accept message indicates the GPRS and Non-GPRS successful.

In an embodiment, the combined registration accept message is the TAU accept message with EPS update result IE as "combined TA/LA updated": Tracking and location area updating is successful for the EPS and non-EPS services and if the TAU accept message doesn't include an additional update result Information Element (IE) with value "SMS only" and the mobile terminal is not configured for the NAS signaling low priority, then the timer T3246 is stopped.

In an embodiment, the combined registration accept message is the TAU accept message with EPS update result IE as "combined TA/LA updated": Tracking and location area updating is successful for the EPS and non-EPS services and if the TAU accept message doesn't include an additional update result Information Element (IE) with value "SMS only" and the mobile terminal is configured for the NAS signaling low priority, then the timer T3246 is continued.

In an embodiment, the combined registration accept message is an attach accept message with the EPS attach result IE value as "combined EPS/IMSI attach" for the EPS and non-EPS services, and if the combined registration accept message does not include an additional update result IE with value "SMS only", and the mobile terminal is not configured for the NAS signaling low priority then the timer T3246 is stopped.

In an embodiment, the combined registration accept message is an attach accept message with the EPS attach result IE value as "combined EPS/IMSI attach" for the EPS and non-EPS services, and if the combined registration accept message does not include an additional update result IE with value "SMS only", and the mobile terminal is configured for the NAS signaling low priority then the timer T3246 is continued.

In an embodiment, the combined registration accept message is an attach accept message with the EPS attach result IE value as "combined EPS/IMSI attach" for the EPS and non-EPS services, and if the combined registration accept message does not include an additional update result IE with value "SMS only" and the mobile terminal is configured for the NAS low priority signaling, then the timer T3246 is continued.

In an embodiment, the combined registration accept message is the TAU accept message with EPS update result IE as "combined TA/LA updated": Tracking and location area updating is successful for the EPS and non-EPS services and if the TAU accept message includes an additional update result IE with value "SMS only", then the timer T3246 is continued.

In an embodiment, the combined registration accept message is the attach accept message with the EPS attach result IE value as "combined EPS/IMSI attach" i.e. attach for the EPS and non-EPS services, and if the combined registration accept message include an additional update result IE with value "SMS only", then the timer T3246 is continued.

In an embodiment, if the message is the Downlink NAS transport message, then the timer is continued.

Accordingly the embodiments herein provide a mobile terminal. The mobile terminal is configured to receive a message from an entity in a network. The message is one of a combined attach registration message and a NAS transport message. Further, the mobile terminal is configured to determine that a congestion timer T3246 is running. Further, the mobile terminal is configured to perform one of stopping the timer T3246 and continuing the timer T3246.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
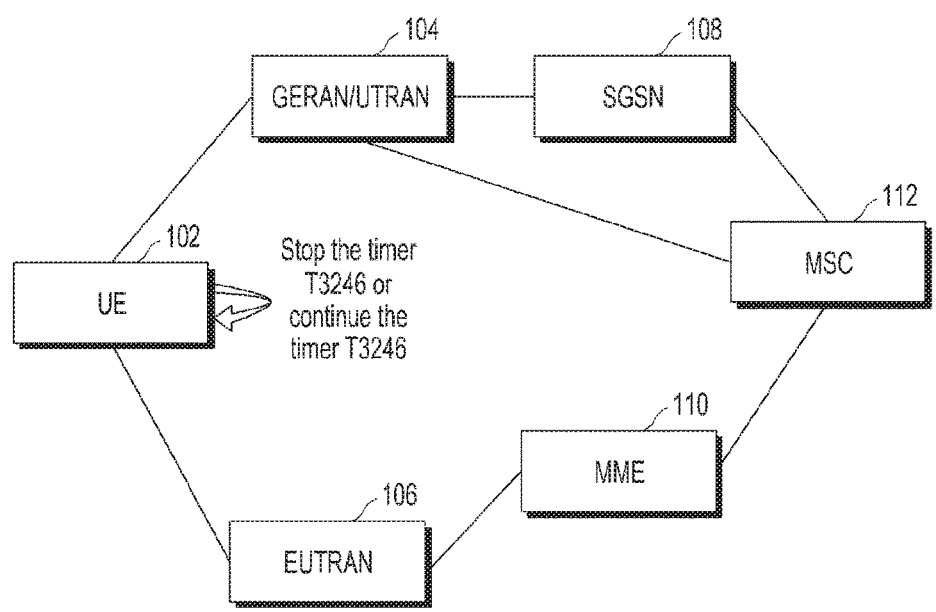
FIG. 1 illustrates simplified view of a system for handling congestion during combined procedures, according to the embodiments as disclosed herein.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The terms timer and congestion timer are used interchangeably throughout the disclosure.

The embodiments herein disclose a method implemented in a mobile terminal. The method includes receiving a message from an entity in a network. Further, the method includes determining that a congestion timer T3246 is running, and performing one of stopping the timer T3246 and continuing the timer T3246.

The proposed method allows the UE to quickly access the CS services when the congestion at the MSC side is cleared.

In an embodiment, if the combined attach accept message does not include the additional update result IE with value "SMS only" and the UE is not configured for the NAS signaling low priority then the UE may stop timer T3246 if the timer T3246 is running.

In an embodiment, if the combined TAU accept message does not include the additional update result IE with value "SMS only" and the UE is not configured for the NAS signaling low priority then the UE may stop timer T3246 if the timer T3246 is running.

In an embodiment, if the UE 102 is not configured for the NAS signaling low priority then the UE may stop the timer T3246 if the timer T3246 is running.

In an embodiment, if the combined attach accept message for GPRS and Non-GPRS services received at the UE when the timer T3246 is running and the UE is not configured for the NAS signaling low priority then the timer T3246 is stopped so that the UE will be able to access the CS MO services.

Referring now to the drawings, and more particularly to FIGS. 1 through 7, where similar reference characters denote corresponding features consistently throughout the figures, there are shown preferred embodiments.

FIG. 1 illustrates simplified view of a system 100 for handling congestion during combined procedures, according to the embodiments as disclosed herein. The system 100 includes a UE 102, a GERAN/UTRAN 104, a EUTRAN 106, a SGSN 108, a MME 110, and a MSC 112. The UE 102 can be, for example but not limited to, a cellular phone, a tablet, a smart phone, a Personal Digital Assistant (PDA), a communication device, or the like.

To a person of ordinary skill in the art refers the UE as a mobile station, a mobile terminal, a subscriber station, a mobile unit, a subscriber unit, a wireless unit, a remote unit, a mobile device, a wireless device, a wireless communications device, a mobile subscriber station, an access terminal, a wireless terminal, a remote terminal, a handset, a user agent, a mobile client, or the like.

The UE 102 receives the message from an entity in a network. In an embodiment, the message is a combined registration accept message. In another embodiment, the message is a downlink NAS transport message. In an embodiment, the entity is MME 110. In another embodiment, the entity is SGSN 108.

After receiving the message, the UE 102 determines that the congestion timer T3246 is running and performs an action (i.e., stopping the timer T3246 or continuing the timer T3246).

In an embodiment, the UE 102 sends a Location Area Update (LAU)/Attach/CM service request message to the MSC 112. In response to request message, the UE 102 receives the LAU/attach/service request reject message along with a timer T3246 value. After receiving the reject message along with timer T3246 value, the UE 102 starts the timer T3246. Meanwhile, there is the intersystem change to the EUTRAN 106 from GERAN/UTRAN 104. The UE 102 sends the combined attach request or the TAU request message for both EPS and non-EPS bearer service to the MME 110. The combined registration accept message contains a low priority indicator set to "the UE 102 is configured for the NAS signaling low priority". After receiving the combined attach request message or the TAU message for both EPS and non-EPS bearer service, the MME 110 sends the forward CS domain registration request message to the MSC 112. After receiving the forward CS domain registration request message, the MSC 112 sends the registration successful message to the MME 110. After receiving the registration successful message, the MME 110 sends the combined registration accept message for the EPS service and non-EPS services along with additional update as 0, 1, 3. After receiving the combined registration accept message, the UE 102 continues to run the timer T3246 as it is not clear whether congestion timer was running because of lower layer congestion or NAS congestion.

In an embodiment, the combined registration accept message is the GPRS attach accept message, and if the UE 102 is configured for the NAS signaling low priority, then the timer T3246 is continued. The attach accept message indicates the GPRS and non-GPRS successful.

In an embodiment, the UE 102 sends the LAU/attach/CM service request message to the MSC 112. In response to request message, the UE 102 receives the LAU/attach/service request reject message along with the timer T3246 value. After receiving the reject message along with the timer value, the UE 102 starts the timer T3246. There is the intersystem change to the EUTRAN from the GERAN/UTRAN 104. The UE 102 sends the combined registration request message both EPS and NON-EPS bearer service to the MME 110. The combined registration accept message does not include the low priority indicator set to "the UE 102 is configured for the NAS signaling low priority". After receiving the combined registration request message for both EPS and NON-EPS bearer service from UE 102, the MME 110 sends the forward CS domain registration request message to the MSC 112. After receiving the forward CS domain registration request message, the MSC 112 sends the registration successful message to the MME 110. After receiving the registration successful message, the MME 110 sends the combined registration accept message for the EPS service and Non-EPS services along with additional update as 0, 1, 3. After receiving the combined registration accept message, the UE 102 stops the timer T3246 operation so as to avoid the congestion at the UE 102. In an embodiment, the UE 102 sends the LAU/attach/CM service request message to the MSC 112. In response to request message, the UE 102 receives the LAU/Attach/service request reject message along with timer T3246 value. After receiving the reject message along with timer T3246 value, the UE 102 starts the timer T3246. There is the intersystem change to the EUTRAN 106 from the GERAN/UTRAN 104. The UE 102 sends the combined registration request message both EPS and non-EPS bearer service to the MME 110. After receiving the combined registration request message both EPS and NON-EPS bearer service, the MME 110 sends the forward CS domain registration request message to the MSC 112. After receiving the forward CS domain registration request message, the MSC 112 sends the registration successful message to the MME 110. After receiving the registration successful message, the MME 110 sends the combined registration accept message for the EPS service and Non-EPS services along with additional update as 2. After receiving the combined registration accept message, the UE 102 continues the timer T3246 operation as this doesn't ensure that congestion is cleared in the MSC 112.

In an embodiment, the combined registration accept message is the TAU accept message for EPS and Non-EPS services, and if the combined registration accept message does not include an additional update result Information Element (IE) with value "SMS only", and the UE 102 is not configured for NAS signaling low then the timer T3246 is stopped.

In an embodiment, the combined registration accept message is the attach accept message for EPS and Non-EPS services, and if the combined registration accept message does not include an additional update result IE with value "SMS only", and the UE 102 is not configured for NAS signaling low the timer T3246 is stopped.

In an embodiment, the combined registration accept message is an attach accept message with the EPS attach result IE value as "combined EPS/IMSI attach" for the EPS and non-EPS services, and if the combined registration accept message does not include an additional update result IE with value "SMS only" and the mobile terminal is configured for the NAS low priority signaling, then the timer T3246 is continued.

In an embodiment, the combined registration accept message is the TAU accept message, and if the combined registration accept message include the additional update result IE with value "SMS only", then the timer T3246 is continued.

In an embodiment, the combined registration accept message is the attach accept message, and if the combined registration accept message include the additional update result IE with value "SMS only", then the timer T3246 is continued.

In an embodiment, the UE 102 sends the LAU/Attach/CM service request message to the MSC 112. In response to request message, the UE 102 receives the LAU/Attach/service request reject message along with the timer T3246 value. After receiving the reject message along with the timer T3246 value, the UE 102 starts the timer T3246 operation. The UE 102 triggers to send the attach request. The GERAN/UTRAN 104 sends the combined attach request message for both EPS and Non-EPS bearer service to the SGSN 108. The combined attach request message includes the low priority indicator set to "the UE 102 is configured for the NAS signaling low priority". After receiving the combined registration request message, the SGSN 108 forwards the CS domain registration request message to the MSC 112. After receiving the forward CS domain registration request message, the MSC 112 sends the registration successful message to the SGSN 110. After receiving the registration successful message, the SGSN 108 sends the combined registration accept message to the UE 102. The combined registration accept message indicates successful registration for GPRS and Non-GPRS services. After receiving the combined registration accept message, the UE 102 continues the timer T3246 operation as the UE timer T3246 could be running because of "the RRC connection reject with wait timer" and not necessarily because of a core network as the UE 102 has indicated that it is configured for the NAS signaling low priority. In an embodiment, the UE 102 sends the LAU/Attach/CM service request message to the MSC 112. In response to request message, the UE 102 receives the LAU/Attach/service request reject message along with the timer value. After receiving the reject message along with the timer T3246 value, the UE 102 starts the timer T3246 operation. The UE 102 triggers to send the attach request. The GERAN/UTRAN 104 sends the combined registration request message for both GPRS and non-GPRS to the SGSN 108. The combined registration request message request message indicates that the low priority indicator is not set to "the UE 102 is configured for the NAS signaling low priority". After receiving the combined registration request message, the SGSN 108 forwards the CS domain registration request message to the MSC 112. After receiving the forward CS domain registration request message, the MSC 112 sends the registration successful message to the SGSN 110. After receiving the registration successful message, the SGSN 108 sends the combined registration accept message successful message to the UE 102. The combined registration accept message indicates successful registration for the GPRS and Non-GPRS services. After receiving the combined registration accept message, the UE 102 stop the timer T3246 operation so as to avoid the congestion at the UE 102 as congestion has cleared on the network side.

The FIG. 1 shows the limited overview of the system 100 but, it is to be understood that other embodiments are not limited thereto. Further, the system 100 can include any number of hardware or software components communicating with each other. For example, the component can be, but not limited to, a process running in the controller or processor, an object, an executable process, a thread of execution, a program, or a computer.

Figure 2:
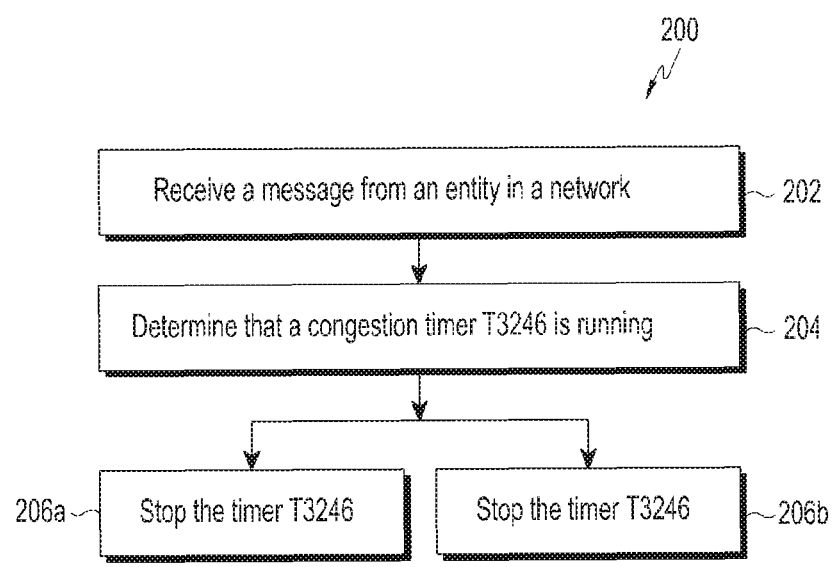
FIG. 2 is a flow diagram illustrating a method for handling congestion during combined procedures, according to the embodiments as disclosed herein.

FIG. 2 is a flow diagram 200 illustrating a method for handling congestion during combined procedures, according to the embodiments as disclosed herein. At step 202, the method includes receiving the message from the entity in the network. In an embodiment, the message is a combined registration accept message. In an embodiment, the message is a downlink NAS transport message. At step 204, the method includes determining that the congestion timer T3246 is running. In an embodiment, at step 206*a*, the method includes stopping the timer T3246. In an embodiment, at step 206*b*, the method includes continuing the timer T3246.

The proposed method allows the UE 102 to access the CS services when congestion at the MSC 112 is cleared.

In an embodiment, the combined registration accept message is the TAU accept message, and if the combined registration accept message does not include an additional update result Information Element (IE) with value "SMS only" and the UE 102 is not configured for the NAS signaling low priority, then the timer T3246 is stopped.

In an embodiment, the combined registration accept message is the attach accept message, and if the combined registration accept message does not include an additional update result IE with value "SMS only" and the UE 102 is not configured for the NAS signaling low priority, then the timer T3246 is stopped.

In an embodiment, the combined registration accept message is the TAU accept message, and if the combined registration accept message include the additional update result IE with value "SMS only", then the timer T3246 is continued.

In an embodiment, the combined registration accept message is the attach accept message, and if the combined registration accept message include the additional update result IE with value "SMS only", then the timer T3246 is continued.

The various actions, acts, blocks, steps, and the like in the method may be performed in the order presented, in a different order or simultaneously. Further, in some embodiments, some actions, acts, blocks, steps, and the like may be omitted, added, modified, skipped, and the like without departing from the scope of the present disclosure.

Figure 3:
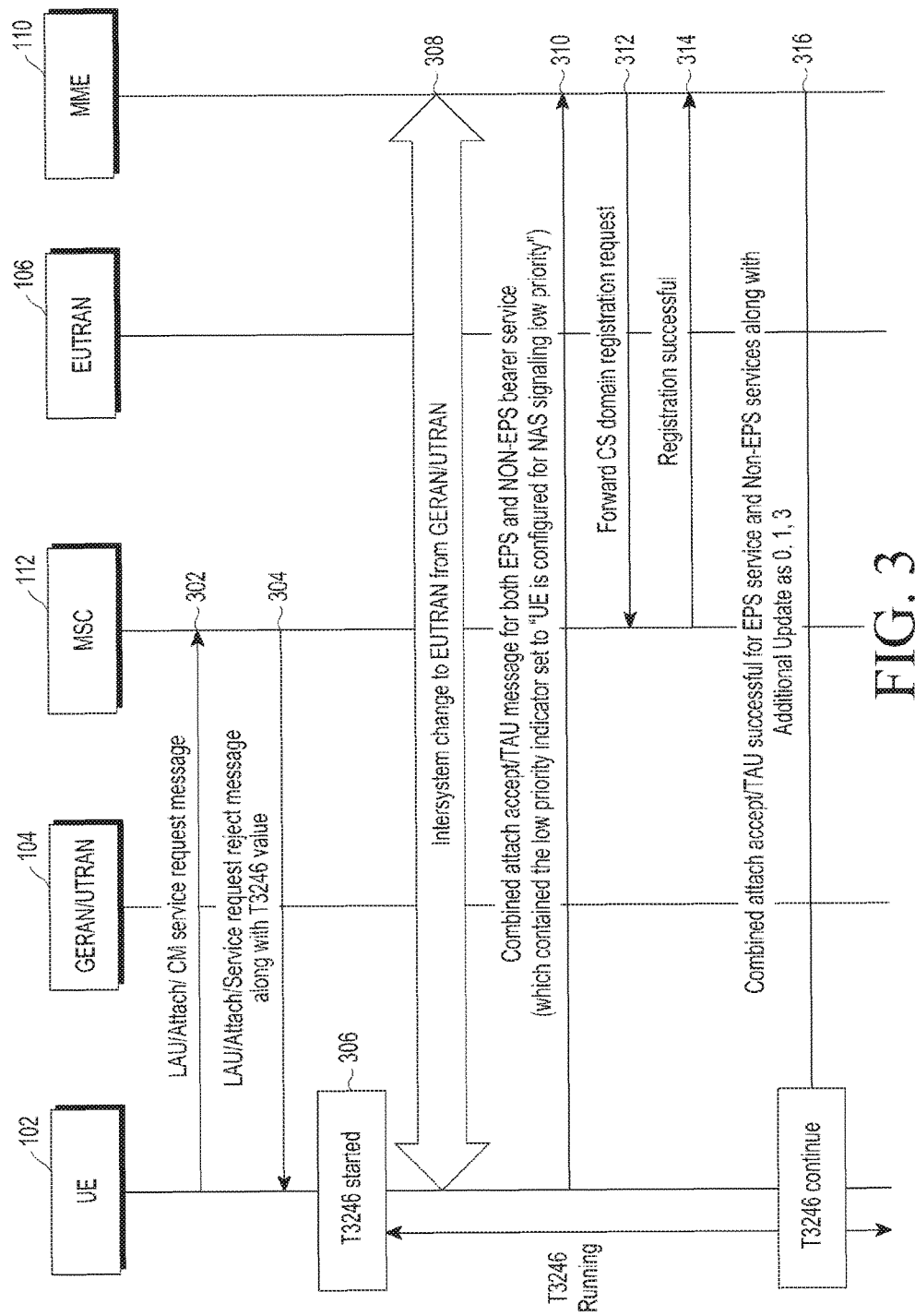
FIGS. 3-5 are sequence diagrams explaining various steps involved in combined registration accept message or TAU successful for the EPS service and the non-EPS services, according to embodiments as disclosed herein.
Figure 4:
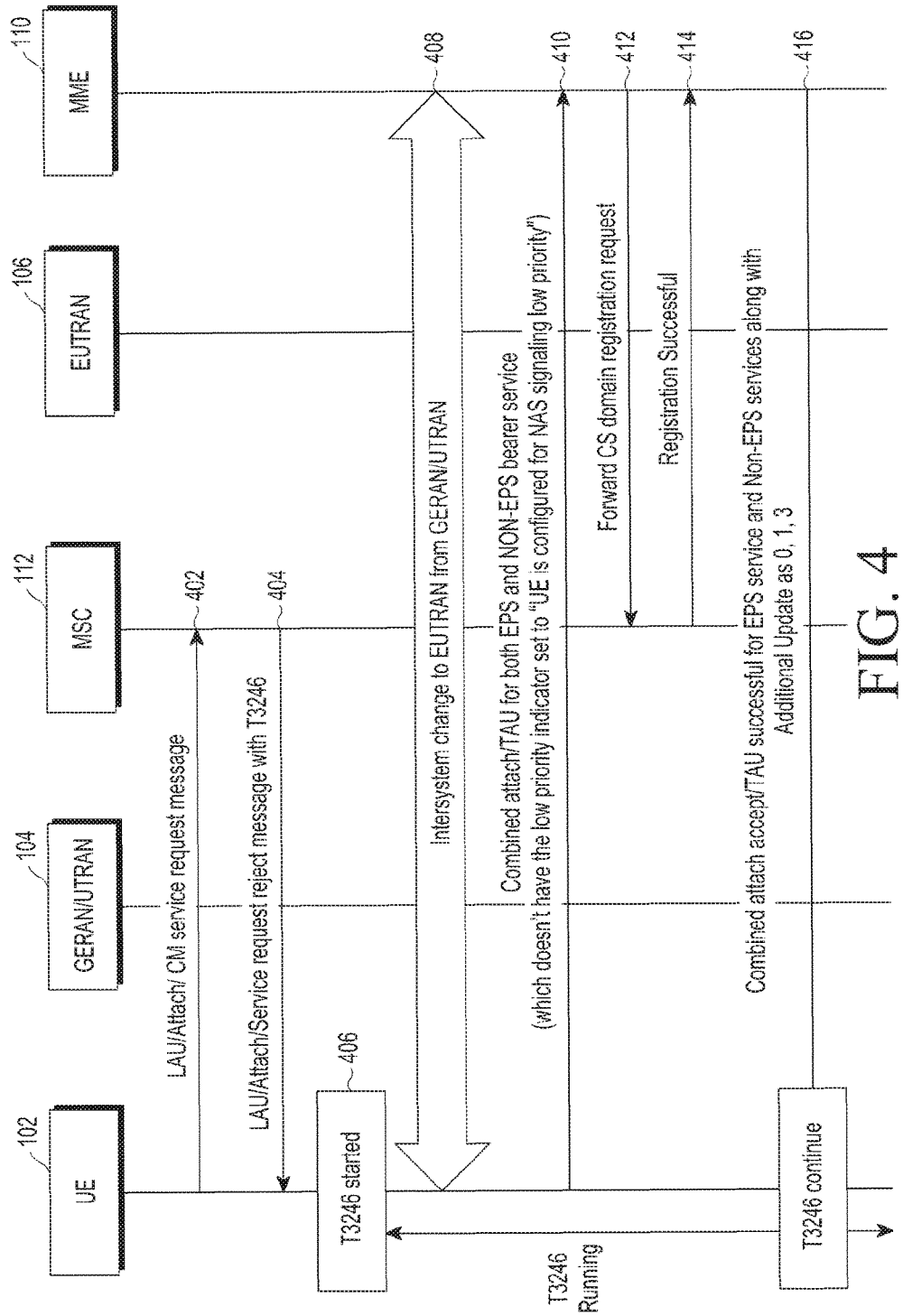
Figure 5:
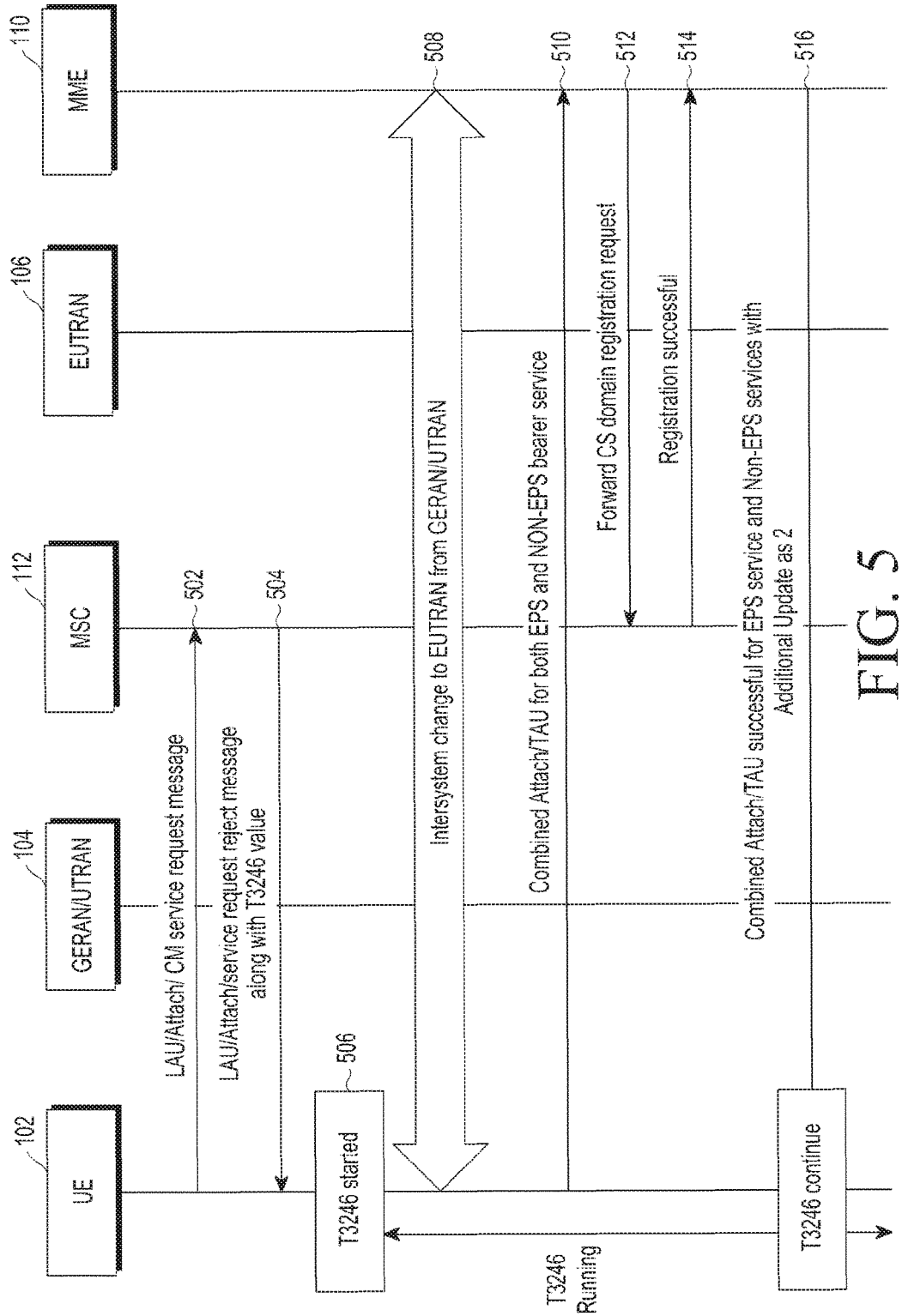

FIGS. 3-5 are sequence diagrams explaining various steps involved in the combined registration for the EPS service and the non-EPS services, according to embodiments as disclosed herein. In FIG. 3, the UE 102 sends (302) the LAU/Attach/CM service request message to the MSC 112. In response to request message, the UE 102 receives (304) the LAU/Attach/service request reject message along with timer T3246 value. After receiving the reject message along with timer value, the UE 102 starts (306) the timer T3246. Intersystem change happens (308) from the GERAN/UTRAN 104 to the EUTRAN 106. The UE 102 sends (310) the combined registration request message for both EPS and NON-EPS bearer service to the MME 110. The combined registration request message contains a low priority indicator set to "the UE 102 is configured for the NAS signaling low priority". After receiving the combined registration request message for both EPS and NON-EPS bearer service, the MME 110 (312) the forwards the CS domain registration request message to the MSC 112. After receiving the forward CS domain registration request message, the MSC 112 sends (314) the registration successful message to the MME 110. After receiving the registration successful message, the MME 110 sends (316) the combined registration accept message for the EPS service and Non-EPS services along with additional update as 0, 1, 3 as shown in the Table 1.

TABLE 1

| Bit | Bit | Definition | Value of additional update type |
|---|---|---|---|
| 0 | 0 | No additional information | 0 |
| 0 | 1 | CS Fallback not preferred | 1 |
| 1 | 1 | Reserved | 3 |

After receiving the combined registration accept message, the UE 102 continues the timer operation as it is possible that T3246 is running because of "the RRC connection reject with wait timer" and not necessarily because of a core network as the UE 102 has indicated that it is configured for the NAS signaling low priority.

As shown in the FIG. 4, the UE 102 sends (402) the LAU/Attach/CM service request message to the MSC 112. In response to request message, the UE 102 receives (404) the LAU/Attach/service request reject message along with timer T3246 value. After receiving the reject message along with timer T3246 value, the UE 102 starts (406) the timer T3246. Intersystem change happens (408) from the GERAN/UTRAN 104 to the EUTRAN 106. The UE 102 sends (410) the combined registration request message for both EPS and NON-EPS bearer service to the MME 110. The combined registration request message does not include the low priority indicator set to "the UE 102 is configured for the NAS signaling low priority". After receiving the combined registration request message for both EPS and NON-EPS bearer service, the MME 110 sends (412) the forward CS domain registration request message to the MSC 112. After receiving the forward CS domain registration request message, the MSC 112 sends (414) the registration successful message to the MME 110. After receiving the registration successful message, the MME 110 sends (416) the combined registration accept message for the EPS service and Non-EPS services along with additional update as 0, 1, and 3. After receiving the combined registration accept message, the UE 102 stops the timer T3246 operation so as to avoid the congestion at the UE 102 as the congestion has cleared at the network side.

As shown in FIG. 5, the UE 102 sends (502) the LAU/Attach/CM service request message to the MSC 112. In response to request message, the UE 102 receives (504) the LAU/Attach/service request reject message along with timer T3246 value. After receiving the reject message along with timer T3246 value, the UE 102 starts (506) the timer T3246. Intersystem change happens (508) from the GERAN/UTRAN 104 to the EUTRAN 106. The UE 102 sends (510) the combined registration request message for both EPS and NON-EPS bearer service to the MME 110. After receiving the combined registration request message both EPS and NON-EPS bearer service, the MME 110 sends (512) the forward CS domain registration request message to the MSC 112. After receiving the forward CS domain registration request message, the MSC 112 sends (514) the registration successful message to the MME 110. After receiving the registration successful message, the MME 110 sends (516) the combined registration accept message for the EPS service and Non-EPS services along with additional update as 2. After receiving the combined registration accept message, the UE 102 continues the timer T3246 operation as additional update 2 (as shown in the Table 2) doesn't ensure that the congestion is cleared at the MSC 112.

TABLE 2

| Bit | Bit | Definition | Value of additional update type |
|---|---|---|---|
| 1 | 0 | SMS only | 2 |

Figure 6:
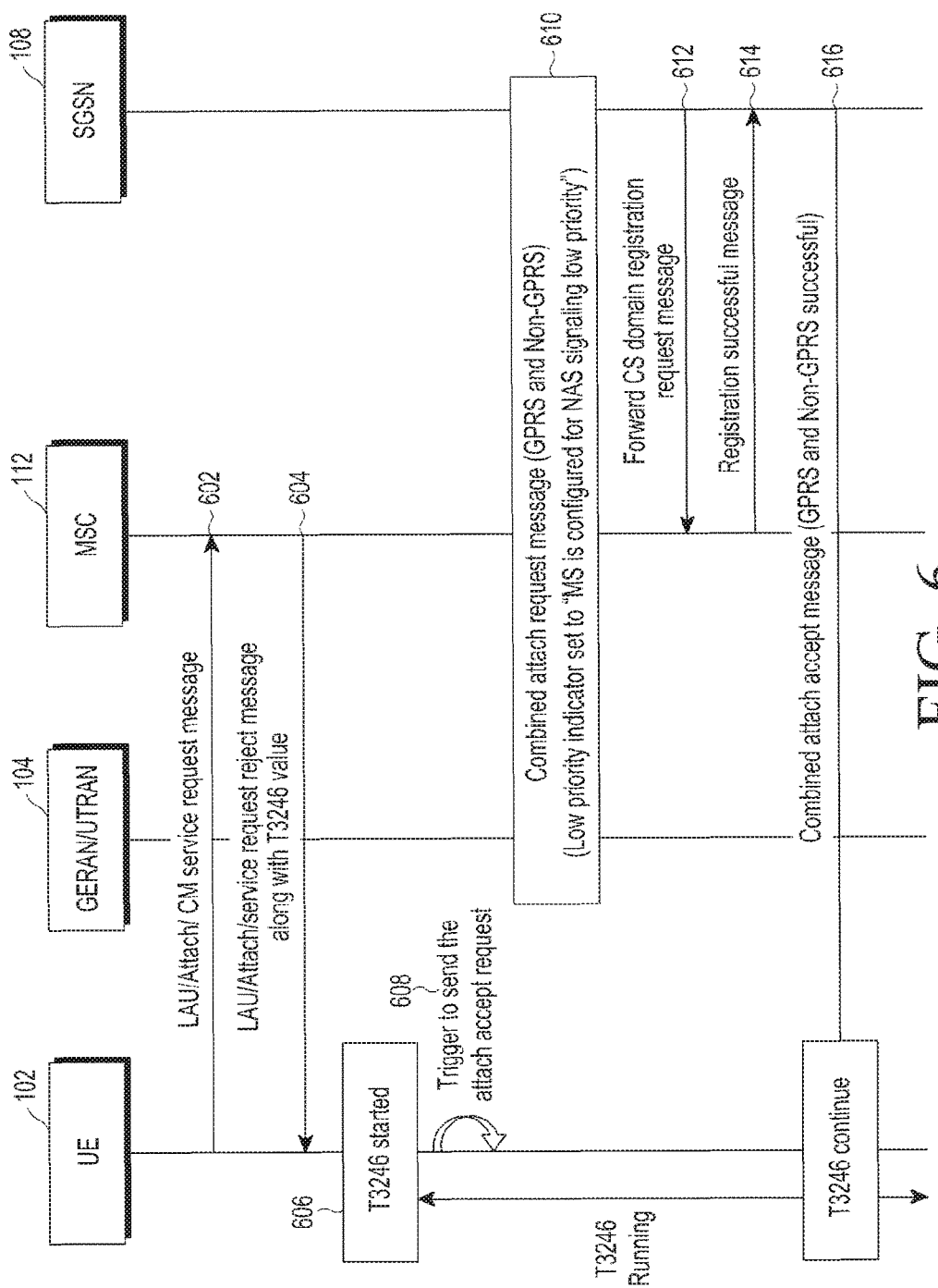
FIG. 6 and FIG. 7 are sequence diagrams explaining various steps involved in combined registration accept message for GPRS and non-GPRS successful, according to embodiments as disclosed herein.
Figure 7:
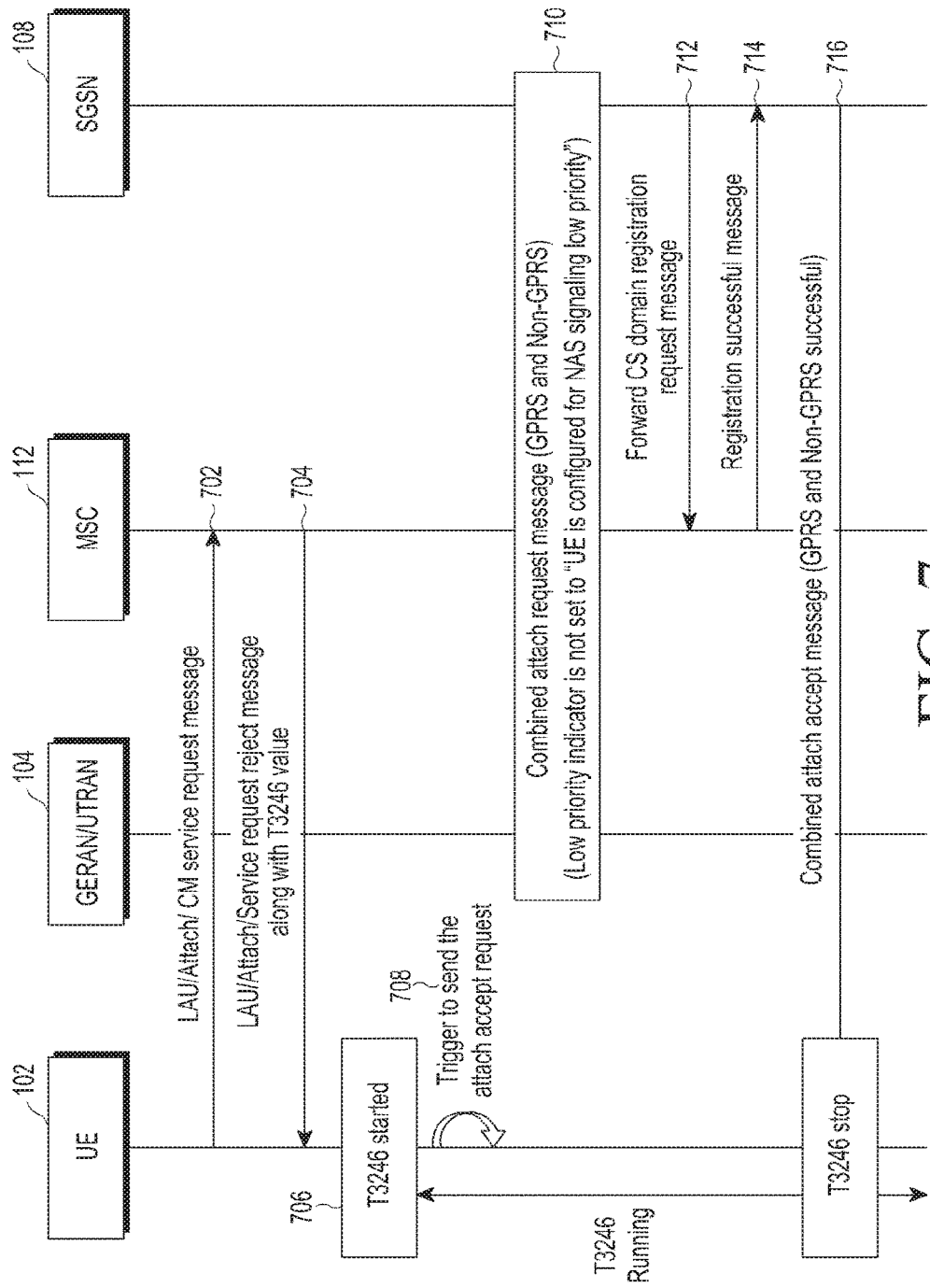

FIG. 6 and FIG. 7 are sequence diagrams explaining various steps involved in the combined registration for GPRS and non-GPRS successful, according to embodiments as disclosed herein. The UE 102 sends (602) the LAU/Attach/CM service request message to the MSC 112. In response to request message, the UE 102 receives (604) the LAU/Attach/service request reject message along with a timer T3246 value. After receiving the reject message along with the timer T3246 value, the UE 102 starts (606) the timer T3246 operation. The UE 102 triggers (608) to send the attach request. The GERAN/UTRAN 104 sends (610) the combined attach request for both GPRS and NON-GPRS bearer service to the SGSN 108. The combined attach request message includes the low priority indicator set to "the UE 102 is configured for the NAS signaling low priority". After receiving the combined registration request message, the SGSN 108 (612) forwards the CS domain registration request message to the MSC 112. After receiving the forward CS domain registration request message, the MSC 112 sends (614) the registration successful message to the SGSN 110. After receiving the registration successful message, the SGSN 108 sends (616) the combined registration accept message successful message to the UE 102. The combined registration accept message indicates attach for the GPRS and Non-GPRS services. After receiving the combined registration accept message, the UE 102 continues the timer T3246 operation as it is possible that the T3246 is running because of "RRC connection reject with the wait timer" and not necessarily because of the core network as the UE 102 has indicated that it is configured for the NAS signaling low priority.

As shown in the FIG. 7, the UE 102 sends (702) the LAU/Attach/CM service request message to the MSC 112. In response to request message, the UE 102 receives (704) the LAU/Attach/service request reject message along with the timer T3246 value. After receiving the reject message along with the timer T3246 value, the UE 102 starts (706) the timer T3246 operation. The UE 102 triggers (708) to send the attach request. The GERAN/UTRAN 104 sends (710) the combined attach request message for both GPRS and non-GPRS to the SGSN 108. The combined attach request message indicates that the low priority indicator is not set to "the UE 102 is configured for the NAS signaling low priority". After receiving the combined registration request message, the SGSN 108 sends (712) the forward CS domain registration request message to the MSC 112. After receiving the forward CS domain registration request message, the MSC 112 sends (714) the registration successful message to the SGSN 110. After receiving the registration successful message, the SGSN 108 sends (716) the combined registration accept message to the UE 102. The combined registration accept message indicates successful registration for the GPRS and Non-GPRS services. After receiving the combined registration accept message, the UE 102 stop the timer T3246 operation so as to avoid the congestion at the UE 102 during the combined procedure.

In an embodiment, when the UE 102 triggers combined registration procedure in a network mode of operation 1 (NMO1) network while the timer T3246 is running, then the UE 102 shall stop the timer T3246 in case that the combined attach procedure is successful which provides that the low priority indicator is not set to "the UE 102 is configured for the NAS signaling low priority".

In an embodiment, if the UE 102 is configured for the NAS signaling low priority, it is possible that the T3246 is running because of a Radio Resource Connection (RRC) connection reject message from a lower layer with wait time and not because of the MSC being congested. The UE congestion being stopped when it is known that the timer T3246 is started because of congestion from the MSC 112 and not when the T3246 is running because of the RRC connection Reject from the Lower Layer.

The timer T3246 is started because of the RRC connection Reject with Wait Time only in case of "MS is configured for NAS signaling low priority". In other cases it is started because of MSC 112 being congested.

The embodiments disclosed herein can be implemented through at least one software program running on at least one hardware device and performing network management functions to control the elements. The elements shown in FIGS.1 through 7 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for controlling congestion in a mobile terminal, the method comprising:
   receiving, by the mobile terminal, a combined registration accept message from an entity in a network while a congestion timer is running in the mobile terminal; and
   stopping, by the mobile terminal, the congestion timer based on information whether the mobile terminal is configured for a non-access stratum (NAS) signaling low priority and information whether the combined registration accept message includes an additional update result information element (IE) with value "SMS only,"
   wherein the combined registration accept message comprises an attach accept message.

2. The method of claim 1, wherein the attach accept message includes an attach result IE value as "combined general packet radio service (GPRS) attach" indicating that an international mobile subscriber identity (IMSI) attach for GPRS and non-GPRS services are successful, and if the mobile terminal is not configured for the NAS signaling low priority, then the congestion timer is stopped.

3. The method of claim 1, wherein the attach accept message includes an attach result IE value as "combined GPRS attach" indicating that the IMSI attach for GPRS and non-GPRS service are successful, and if the mobile terminal is configured for the NAS signaling low priority, then the congestion timer is not stopped.

4. The method of claim 1, wherein the combined registration accept message comprises a tracking area update (TAU) accept message with an evolved packet system (EPS) update result IE value as "combined tracking area (TA)/location area (LA) updated" indicating that the tracking and location area updating is successful for the EPS and non-EPS service, and if the TAU accept message does not include the additional update result IE with the value "SMS only," and the mobile terminal is not configured for the NAS signaling low priority, then the congestion timer is stopped.

5. The method of claim 1, wherein the combined registration accept message comprises a tracking area update (TAU) accept message with an EPS update result IE value as "combined TA/LA updated" indicating that tracking and location area updating is successful for the EPS and non-EPS service, and if the TAU accept message includes the additional update result IE with the value "SMS only," or the mobile terminal is configured for the NAS signaling low priority, then the congestion timer is not stopped.

6. The method of claim 1, wherein if the attach accept message does not include the additional update result IE with the value "SMS only" and the mobile terminal is not configured for the NAS signaling low priority, then the congestion timer is stopped.

7. The method of claim 1, wherein if the attach accept message includes the additional update result IE with the value "SMS only" or the mobile terminal is configured for the NAS signaling low priority, then the congestion timer is not stopped.

8. The method of claim 1, wherein the entity is one of a mobility management entity (MME) and a serving GPRS support node (SGSN).

9. The method of claim 1, wherein the combined registration accept message comprises a tracking area update (TAU) accept message, and when the TAU accept message does not include the additional update result IE with the value "SMS only" and the mobile terminal is not configured for the NAS signaling low priority, the congestion timer is stopped.

10. A mobile terminal for controlling congestion, the mobile terminal comprising:
    a transceiver; and
    at least one processor coupled to the transceiver, wherein the at least one processor is configured to:
    receive a combined registration accept message from an entity in a network while a congestion timer is running in the mobile terminal, and
    stop the congestion timer based on information whether the mobile terminal is configured for a non-access stratum (NAS) signaling low priority and information whether the combined registration accept message includes an additional update result information element (IE) with value "SMS only,"

wherein the combined registration accept message comprises an attach accept message.

11. The mobile terminal of claim 10, wherein the attach accept message includes an attach result information element (IE) value as "combined general packet radio service (GPRS) attach" indicating that an international mobile subscriber identity (IMSI) attach for GPRS and non-GPRS services are successful, and if the mobile terminal is not configured for the NAS signaling low priority, then the congestion timer is stopped.

12. The mobile terminal of claim 10, wherein the attach accept message includes an attach result IE value as "combined GPRS attach" indicating that the IMSI attach for GPRS and non-GPRS service are successful, and if the mobile terminal is configured for the NAS signaling low priority, then the congestion timer is not stopped.

13. The mobile terminal of claim 10, wherein the combined registration accept message comprises a tracking area update (TAU) accept message with an evolved packet system (EPS) update result IE value as "combined tracking area (TA)/location area (LA) updated" indicating that the tracking and location area updating is successful for the EPS and non-EPS service, and if the TAU accept message does not include the additional update result IE with the value "SMS only," and the mobile terminal is not configured for the NAS signaling low priority, then the congestion timer is stopped.

14. The mobile terminal of claim 10, wherein the combined registration accept message comprises a tracking area update (TAU) accept message with an EPS update result IE value as "combined TA/LA updated" indicating that tracking and location area updating is successful for the EPS and non-EPS service, and if the TAU accept message includes the additional update result IE with the value "SMS only," or the mobile terminal is configured for the NAS signaling low priority, then the congestion timer is not stopped.

15. The mobile terminal of claim 10, wherein if the attach accept message does not include the additional update result IE with the value "SMS only" or the mobile terminal is not configured for the NAS signaling low priority, then the congestion timer is stopped.

16. The mobile terminal of claim 10, wherein if the attach accept message includes the additional update result IE with the value "SMS only" and the mobile terminal is configured for the NAS signaling low priority, then the congestion timer is not stopped.

17. The mobile terminal of claim 10, wherein the entity is one of a mobility management entity (MME) and a serving GPRS support node (SGSN).

18. The mobile terminal of claim 10, wherein the combined registration accept message comprises a tracking area update (TAU) accept message, and when the TAU accept message does not include the additional update result IE with the value "SMS only" and the mobile terminal is not configured for the NAS signaling low priority, the congestion timer is stopped.

* * * * *